(12) United States Patent
Desai et al.

(10) Patent No.: US 12,425,851 B2
(45) Date of Patent: Sep. 23, 2025

(54) ANCHORED WI-FI FINGERPRINTING FOR RISK-BASED AUTHENTICATION

(71) Applicant: Cisco Technology, Inc., San Jose, CA (US)

(72) Inventors: Vishal Satyendra Desai, San Jose, CA (US); Shayne Miel, Durham, NC (US); Ardalan Alizadeh, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 382 days.

(21) Appl. No.: 18/122,942

(22) Filed: Mar. 17, 2023

(65) Prior Publication Data

US 2024/0314554 A1 Sep. 19, 2024

(51) Int. Cl.
*H04W 12/06* (2021.01)
*H04W 12/79* (2021.01)
*H04W 84/12* (2009.01)

(52) U.S. Cl.
CPC ........... *H04W 12/06* (2013.01); *H04W 12/79* (2021.01); *H04W 84/12* (2013.01)

(58) Field of Classification Search
CPC ..... H04W 12/06; H04W 12/79; H04W 84/12; H04W 63/107; H04W 4/80; H04W 12/63; H04L 2463/082
See application file for complete search history.

(56) References Cited

U.S. PATENT DOCUMENTS 11,184,766 B1 * 11/2021 Lord ...................... G06V 10/75
2015/0085725 A1    3/2015 Estevez et al.
2017/0006470 A1    1/2017 Gupta
2018/0241626 A1    8/2018 Kumar et al.
2018/0242137 A1    8/2018 Gupta et al.
2019/0364493 A1   11/2019 Yu et al.
2021/0274310 A1    9/2021 Chen et al.
2021/0400485 A1   12/2021 Ergen et al.
2022/0255913 A1    8/2022 Zacks et al.
2022/0255929 A1 *  8/2022 Rafferty ................ H04L 63/107

OTHER PUBLICATIONS

Search Report and Written Opinion for International Application No. PCT/US2024/019682, Dated May 21, 2024, 14 pages.

* cited by examiner

*Primary Examiner* — Brandon J Miller
(74) *Attorney, Agent, or Firm* — Lee & Hayes, P.C.

(57) ABSTRACT

This disclosure describes techniques for using an anchored endpoint to enhance MFA authentication of a client device. A method performed at least in part by a security service includes authenticating of a client device connecting to a secure resource. The method also includes determining a first Wi-Fi fingerprint of the client device, determining that the client device is within a threshold proximity to an anchor device, and determining a second Wi-Fi fingerprint of the anchor device. The method also includes detecting a change to the first Wi-Fi fingerprint of the client device and determining that the second Wi-Fi fingerprint of the anchor device has not changed. The method also includes determining whether the client device is within the threshold proximity of the anchor device, if it is, access to the secured resource continues to be allowed, if it is not, a reauthentication of the client device is triggered.

20 Claims, 5 Drawing Sheets

ANCHORED WI-FI FINGERPRINTING FOR RISK-BASED AUTHENTICATION

TECHNICAL FIELD

The present disclosure relates generally to enhancing Wi-Fi fingerprinting of a client device using a Wi-Fi fingerprint of an anchor device and a threshold proximity between the client device and anchor device to determine whether to continue allowing the client device access to a secured resource or requiring reauthentication of the client device.

BACKGROUND

Authentication is the process of verifying the identity of a user or device. In general, computer security systems perform authentication as a prerequisite for enabling a device to connect to a secured resource, such as a remote resource. By authenticating the user or device, the security systems can prevent an unauthorized user or device from accessing the secured resource.

Multi-factor authentication (MFA) is the process of verifying the identity of the user or device based on confirmation of at least two factors from the user or device. For example, a password entered into the device may be a first factor and a picture of a particular user associated with the device may be a second factor. Computer security systems may prevent the user or device from accessing the secured resource until the systems receive the multiple factors from the user or device. In general, an MFA scheme is more stringent than a single-factor authentication scheme and can therefore enhance the security of the protected resource.

In various examples, a security system may force the user or device to reauthenticate after expiration of a particular time period. However, users may find repeated reauthentication, particularly complex MFA processes, frustrating and inconvenient. In addition, some authentication factors associated with an MFA process are more difficult or invasive for a user to input than others. Accordingly, it may be advantageous to implement an MFA process that is repeated relatively infrequently for devices and users that are more likely to be authorized.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
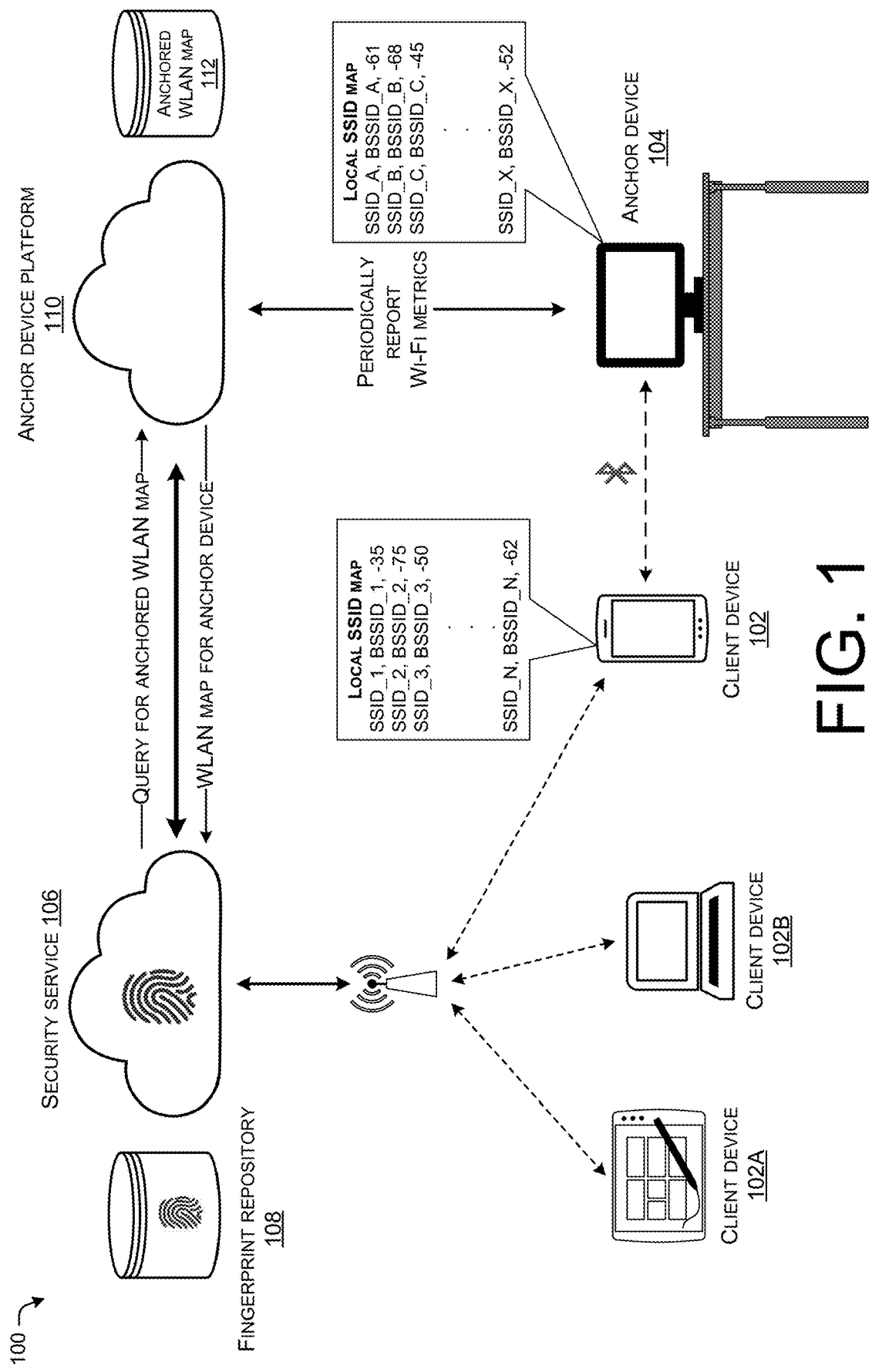
FIG. 1 illustrates an example environment for enhancing Wi-Fi fingerprinting using proximity to an anchor device for determining whether to continue allowing access to a secure resource or trigger reauthentication.

This disclosure describes various techniques for enhancing Wi-Fi fingerprinting of a client device using a Wi-Fi fingerprint of an anchor device and the threshold proximity between the client device and anchor device to determine whether to continue allowing the client device access to a secured resource or requiring reauthentication of the client device. An example method includes performing, an authentication of a client device connecting to a secure resource. The method further includes determining a first Wi-Fi fingerprint of the client device. The method further includes determining that the client device is within a threshold proximity to an anchor device. The method also includes determining a second Wi-Fi fingerprint of the anchor device. The method further includes detecting a change to the first Wi-fi fingerprint of the client device. The method also includes determining that the second Wi-Fi fingerprint of the anchor device has not change. Finally, the method includes determining whether the client device is within the threshold proximity of the anchor device and in response to the client device being within the threshold proximity of the anchor device, continuing to allow access to the secured resource, and in response to the client device not being within the threshold proximity of the anchor device, triggering a reauthentication of the client device.

Example Embodiments

As described above, a security service may force a user or device to reauthenticate after expiration of a particular time period. However, users may find particularly complex MFA processes to be frustrating and inconvenient when forced to repeat reauthentication regularly. In addition, some authentication factors associated with an MFA process are more difficult or invasive for a user to input than others. Accordingly, it may be advantageous to implement an MFA process that is repeated relatively infrequently for devices and users that are more likely to be authorized.

One strategy for reducing the relative frequency that a user or device is required to reauthenticate is to only trigger a reauthentication when a location change is detected. However, a VPN connection will replace your actual IP address and make it appear that a connection is from a different location, the physical location of the VPN server, rather than the real location from which a device is attempting to connect to a secure resource. Thus, a reauthentication may be triggered unnecessarily. In order to reduce the amount of reauthentications triggered unnecessarily, an additional location confirmation may be used to determine that the physical location a user or device is attempting to access a secured resource from is a known acceptable location (e.g., place of work, home, etc.). One trusted way to determine location is by using Wi-Fi fingerprinting. The values of a Wi-Fi Service Set Identifier (SSID) scan list available to a device is run through a hashing algorithm (e.g., MinHash) and the resulting hash value is a Wi-Fi "fingerprint" that can be compared with other Wi-Fi fingerprints to determine whether the fingerprints are similar enough to ensure that they are from a same location. When the Wi-Fi fingerprint of the device changes, indicating a location change of the device has occurred, a security service may require reauthentication of the device in order to grant or continue to grant access to a secured resource. Although Wi-Fi fingerprinting is a less intrusive risk-based authentication that can be used as an effective location proxy for a security service, Wi-Fi fingerprinting may still result is a device being required to reauthenticate more than necessary, as even a small amount of movement by the device, can result in a change to the Wi-Fi fingerprint, triggering reauthentication. This may result in excessive reauthentication when a user simply moves a laptop from one side of a room to another for example. Thus, a small change in location may appear to be a significant change in the Wi-Fi fingerprint of a device. This sensitivity to minimal movement, can result in unnecessary reauthorization requirements for a client device connecting to a secure resource.

This disclosure describes various techniques for enhancing Wi-Fi fingerprinting to determine when a reauthentication for a client device is appropriate based on a threshold proximity to one or more anchor device(s). In general, various techniques described herein can be used to adjust a security policy associated with a client device based on the physical proximity of the other anchor device(s). The techniques described herein support a less intrusive risk-based authentication process that is geared to the changing policies many organizations have implemented to include both remote and hybrid workers by introducing device anchored Wi-Fi fingerprint authentication.

An anchor device may be a stationary or primarily stationary endpoint device that collects a set of Wi-Fi measurements and SSID list in order to assess Unified CM Call Quality Grades, wireless link quality and performance of the anchor device. The anchor device may collect Wi-Fi metrics periodically (e.g., every 30 minutes) and report the Wi-Fi metrics to a platform associated with the anchor device. Additionally, an anchor device may support much higher scan dwell times plus a stable RF frontend to minimize variability in the Wi-Fi telemetry. Therefore, benchmark Wi-Fi fingerprints collected by the anchor device will be significantly more stable than those collected by other mobile devices, such as laptops, cell phones, tablets, etc. Furthermore, one of the major concerns with laptops, smartphones, and such is their nature of mobility. A slight variation in the device location will also lead to significant variability in the SSID scan list, resulting in a potentially false detection of a location change and triggering unnecessary reauthentication of the device. However, an anchor device that is primarily a stationary device will not lead to a variance in the scan list due to any mobility related concerns. Thus, an anchor device having a superior RF frontend, high dwell, and stationary nature will result in significantly better Wi-Fi scan benchmarks for a specific location compared to other mobile resources.

When a client device (e.g., laptop, smartphone, etc.) is within a close proximity to an endpoint anchor device, the location of the client device can be verified. Thus, even if the client device is mobile, and its location changes enough (e.g., a laptop is moved across a room) to change the Wi-Fi fingerprint of the client device, using a proximity to an anchor device, the client device may not be triggered to reauthenticate when it is within a threshold proximity to the anchor device, even when the Wi-Fi fingerprint of the client device changes.

Although a client device's proximity to an anchor device may be determined in multiple ways, techniques herein will primarily be described using a Bluetooth connection between the client device and the anchor device to verify close proximity between the two devices. Additionally, cross correlation between a client device and an anchor device may be done using Bluetooth Low Energy (BLE) Signal to Noise Ratio (SNR) biased SSID comparison between endpoints. For example, when a client device is in close proximity to multiple anchor devices, a BLE signal between the client device and the anchor devices will be utilized to assess a level of SSID biasing performed for the validations.

Alternately or in addition, in the event Bluetooth is not available or disabled, historical Wi-Fi association can be queried such as WLAN name, Basic Service Set Identifier (BSSID), and Signal Range (available at device's Wi-Fi utility) to profile whether the client device is in a known location such as workplace, home office, café, etc. Once a security service receives a Wi-Fi fingerprint of a client device, the security service may query an anchor device within the threshold proximity to provide a list of anchored SSID benchmarks to validate the client device scan list. If there are multiple anchor devices within the threshold proximity (e.g., in an adjacent room), multiple sets of measurements may be collected resulting in a robust benchmark. The Wi-Fi fingerprint of the client device may be compared to the Wi-Fi fingerprint of an anchor device with a similar fingerprint, and when there is enough similarity, based on a user defined metric, a conclusion can be made that the client device is in a similar location to the anchor device. Thus, if the location is a known trusted location (e.g., work, home, etc.) a reauthentication of the device may not be triggered.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for enhancing Wi-Fi fingerprinting of a client device using a Wi-Fi fingerprint of an anchor device and a threshold proximity between the client device and the anchor device to determine whether to continue allowing the client device access to a secured resource or requiring reauthentication of the client device.

The example environment 100 includes several examples of client devices 102, including client device 102, client device 102A, and client device 102B. A client device may be any type of user endpoint device such as a laptop, cell phone, tablet and the like. With reference to FIG. 1 discussion herein will primarily focus on client device 102 (the cell phone) but also applies to a laptop (client device 102B), a tablet (client device 102A), or any other appropriate type of user endpoint device. Additionally, environment 100 include anchor device 104. The anchor device may be a primarily stationary device such as the example illustrated in FIG. 1. For example, the anchor device 104 may be a video conferencing device, or any other appropriate primarily stationary device that collects a set of Wi-Fi measurements and SSID list in order to assess Unified CM call Quality Grades, wireless link quality and performance of the anchor device. Additionally, the anchor device 104 will support a much higher scan dwell time plus a stable RF frontend to minimize variability in the Wi-Fi telemetry as compared to a typical mobile device. Thus, benchmark Wi-Fi fingerprints collected by the anchor device 104 will be significantly more stable than other mobile devices.

Environment 100 also includes a security service 106 that may be configured to protect the remote resource, and the sensitive data associated with the remote resource, by implementing a security policy for remote resources that a client device 102 may attempt to access. The security service 106 may be implemented by hardware (e.g., one or more server computers), software (e.g., instructions executed by one or more server computers), or a combination thereof. The security service 106 may implement one or more procedures that prevent access to and/or modification of a protected resource. For example, the security service 106 may be configured to authenticate a client device 102 and/or a user of the client device 102 prior to enabling the client device 102 to receive data from and/or transmit data to a remote resource.

In some implementations, the security service 106 protects remote resources using MFA. An MFA uses a process of confirming that a device, the identity of a user of the device, or both, are authorized by requesting and receiving at least two authentication factors from the device, the user, and/or one or more additional devices associated with the user. A user or device is "authorized" when they have permission to access a secure resource. When compared to single-factor authentication, MFA is more likely to successfully authenticate an authorized user or device and to successfully deny an unauthorized user or device. An example MFA process includes requesting a first authentication factor: based on receiving the first authentication factor, requesting a second authentication factor: and based on receiving the second authentication factor, enabling access to a protected resource. The first authentication factor and/or the second authentication factor can be received from a single device or multiple devices associated with the same user.

Certain authentication factors include evidence that a device is in a particular location associated with an authorized user. For example, an authentication factor may be evidence that a client device 102 is located in a building associated with a home or workplace of the authorized user. Wi-Fi fingerprinting may be used in a location determination of a client device 102. The security service 106 may use Wi-Fi fingerprinting to optimize zero trust MFA via processing WLAN SSID information derived from devices and compare the Wi-Fi fingerprints to historical benchmarks at a similar location Using location to enhance MFA may reduce successive MFA attempts and create a better user experience while increasing security. The Wi-Fi fingerprint historical benchmarks may be stored in a fingerprint repository 108. The benchmark fingerprints stored in the repository may be used to compare with a Wi-Fi fingerprint of a device attempting to access a secured resource at a subsequent time.

In various implementations, the security service 106 may reauthenticate entities connected to, or attempting to connect to, remote resources. For example, the security service 106 may allow client device 102 to connect to a remote resource in response to authenticating the client device 102 a first time, disconnect client device 102 from the remote resource after a time interval after authenticating the client device 102 the first time has expired, and may only enable client device 102 to reconnect to the remote resource if the security service 106 is able to authenticate the client device 102 a second time. This reauthentication interval may be fixed or adjusted based on a security policy for an enterprise organization. However, as described above, a reauthentication interval may be extended by only triggering a reauthentication when a location change of the client device 102 is detected.

In an attempt to avoid unnecessarily triggering a reauthentication due to a perceived location change (e.g., because of VPN), a location of client device 102 is determined using Wi-Fi fingerprinting. Based on a hash value of the available Wi-Fi SSID's available to client device 102 as shown, the security service 106 can determine if client device 102 is at a known location (e.g., home, work, etc.) based on a comparison to historical Wi-Fi fingerprint benchmark values for the location. When the Wi-Fi fingerprint of the device changes, the security service 106 may then require reauthentication of client device 102 in order to grant or continue to grant access to a secured resource. However, Wi-Fi fingerprinting may still result in the client device 102 being required to reauthenticate more than necessary, as even a small amount of movement by the device can result in a change to the Wi-Fi fingerprint, triggering reauthentication.

To further reduce the unnecessary reauthentication of client device 102 due to a falsely detected location change, a threshold proximity between the anchor device 104 and the client device may be determined, and the Wi-Fi fingerprint of the anchor device 104 may be used to verify a location of the client device 102. Thus, even if client device 102 moves enough to detect a change in its Wi-Fi fingerprint (e.g., moved across a room), using a threshold proximity to anchor device 104, the client device 102 may not be triggered to reauthenticate when it is within the threshold proximity to the anchor device 104, even when the Wi-Fi fingerprint of the client device 102 changes.

In some implementations, the proximity of the client device 102 to the anchor device 104 is determined using Bluetooth as shown in FIG. 1. Although it should be understood that any other appropriate means of determining a proximity between the client device 102 and the anchor device 104 may be used to implement techniques described herein. The security service 106 may receive Bluetooth pairing information indicating that the client device 102 and the anchor device 104 are paired. Because Bluetooth is designed for data exchange between devices over a short distance, when the client device 102 and the anchor device 104 are paired via Bluetooth, they are, by nature of Bluetooth, within a close proximity to one another, ensuring the location of the client device 102 is essentially the same as the location of the anchor device.

Once a security service performs an authentication of the client device 102 to connect to a secured resource, the security service 106 determines the Wi-Fi fingerprint of client device 102. Using Bluetooth as illustrated in FIG. 1, whether the client device 102 is within a threshold proximity to the anchor device 104 is determined. The anchor device 104 periodically sends Wi-Fi metrics to an anchor device platform 110. The Wi-Fi metrics may be used to determine and store an anchored WLAN map 112. The security service 106 may query the anchor device platform 110 for the anchored WLAN map 112, which the anchor device platform, in turn, will send to the security service 106. When the security service 106 detects a change to the Wi-Fi fingerprint of the client device 102, the security service 106 can determine whether the client device 102 remains within a threshold proximity of the anchor device 104 (e.g., determined using Bluetooth), and as long as the Wi-Fi fingerprint of the anchor device 104 remains the same, the security service 106 may continue to allow access to the secured resource. Alternately, if the client device 102 is no longer within the threshold proximity of the anchor device 104, the security service 106 may trigger a reauthentication of the client device 102 to reconnect to the secured resource.

Figure 2:
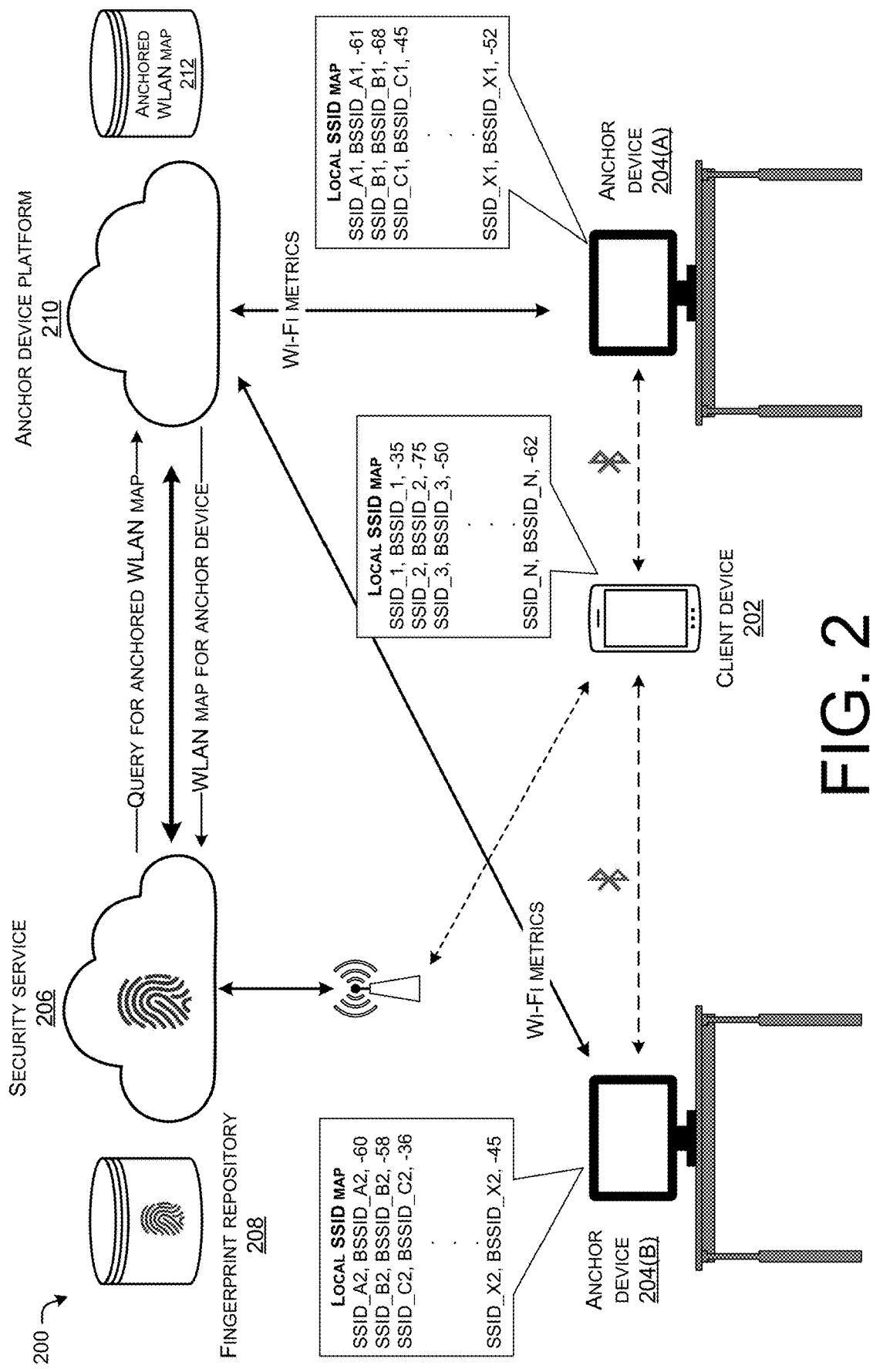
FIG. 2 illustrates an example of an environment for enhancing Wi-Fi fingerprinting using proximity to more than one anchor device for determining whether to continue allowing access to a secure resource or trigger reauthentication.

FIG. 2 illustrates an example of an environment 200 for enhancing Wi-Fi fingerprinting using proximity to more than one anchor device for determining whether to continue allowing access to a secure resource or trigger reauthentication of a client device.

Similar to example environment 100, example environment 200 includes a client device 202, a first anchor device 204(A), and a second anchor device 204(B). Anchor device 204(A) and anchor device 204(B) may both be fairly close to client device 202, for example, anchor device 204(A) and anchor device 204(B) may be video conferencing devices in a same building in adjoining rooms (e.g., adjoining conference rooms in an office building at a workplace of a user). In some instances, anchor device 204(A) and anchor device 204(B) may both be primarily stationary devices that each collect a set of Wi-Fi measurements and SSID list in order to assess Unified CM call Quality Grades, wireless link quality and performance of the respective anchor device and periodically report the Wi-Fi metrics to an anchor device platform 210. Additionally, the anchor device 204(A) and anchor device 204(B) will support a much higher scan dwell time plus have a stable RF frontend to minimize variability in the Wi-Fi telemetry. Thus, benchmark Wi-Fi fingerprints collected by anchor device 204(A) and anchor device 204 (B) will be significantly more stable than other mobile devices, such as client device 202.

Environment 200 also includes a security service 206 that may be configured to protect remote resources, and the sensitive data associated with the remote resources, by implementing security policies for the remote resources that the client device 202 may attempt to access. The security service 206 may be implemented by hardware (e.g., one or more server computers), software (e.g., instructions executed by one or more server computers), or a combination thereof. The security service 206 may implement one or more procedures that prevent access to and/or modification of a protected resource. For example, the security service 206 may be configured to authenticate a client device 202 and/or a user of the client device 202 prior to enabling the client device 202 to receive data from and/or transmit data to a remote resource.

In various examples, the security service 206 protects remote resources using MFA. An MFA uses a process of confirming that a device, the identity of a user of the device, or both, are authorized by requesting and receiving at least two authentication factors from the device, the user, and/or one or more additional devices associated with the user. A user or device is "authorized" when they have permission to access a secure resource. An example MFA process includes requesting a first authentication factor; based on receiving the first authentication factor, requesting a second authentication factor; and based on receiving the second authentication factor, enabling access to a protected resource. One of the authentication factors may include evidence that client device 202 is in a particular location associated with an authorized user. For example, an authentication factor may be evidence that a client device 202 is located in a building associated with a home or workplace of the authorized user. Wi-Fi fingerprinting may be used in determining whether a client device 202 is in a known trusted location. The security service 206 may use Wi-Fi fingerprinting to optimize zero trust MFA via processing WLAN SSID information derived from devices and compare the Wi-Fi fingerprints to historical benchmarks at a similar location. Using evidence of a trusted location to enhance MFA may reduce successive MFA attempts and create a better user experience while increasing security. The Wi-Fi fingerprint historical benchmarks may be stored in a fingerprint repository 208.

The security service 206 may reauthenticate entities connected to, or attempting to connect to, secured resources. For example, the security service 206 may allow client device 202 to connect to a secure resource in response to authenticating the client device 202 a first time, disconnect client device 202 from the remote resource after a time interval after authenticating the client device 202 the first time has expired, and may only enable client device 202 to reconnect to the secure resource if the security service 206 is able to authenticate the client device 202 a second time. However, as described above, a reauthentication interval may be extended by only triggering a reauthentication when a location change of the client device 202 is detected.

To avoid unnecessarily triggering a reauthentication due to a perceived location change (e.g., because of VPN), Wi-Fi fingerprinting may be used to determine whether the client device 202 remains in a known and trusted location or whether client device 202 has in fact changed location. Based on the available Wi-Fi SSID's available to client device 202 as shown in the Local SSID Map associated with client device 202, the security service 206 can determine whether the client device 202 is a at a known location (e.g., home, work, etc.) based on a comparison to historical Wi-Fi fingerprint benchmark values. When the Wi-Fi fingerprint of the device changes, the security service 206 may then require reauthentication of client device 202 in order to grant or continue to grant access to a secured resource. However, Wi-Fi fingerprinting may still result in client device 202 being required to reauthenticate more than necessary, as even a small amount of movement by the client device 202, can result in a change to the Wi-Fi fingerprint, triggering reauthentication.

To reduce the unnecessary reauthentication of client device 202 due to a falsely detected location change based on a change to the Wi-Fi fingerprint for client device 202, a threshold proximity between anchor device 204(A) and/or anchor device 204(B) and the client device 202 may be determined, and the Wi-Fi fingerprint of anchor device 204(A) and/or anchor device 204(B) used to verify a location of the client device 202. Thus, even if client device 202 moves enough to detect a change in its Wi-Fi fingerprint (e.g., moved across a room), using a threshold proximity to anchor device 204(A) and/or anchor device 204(B), the client device 102 may not be triggered to reauthenticate when it is within the threshold proximity to anchor device 204(A) and/or anchor device 204(B), even when the Wi-Fi fingerprint of the client device changes.

The proximity of the client device 202 to anchor device 204(A) and anchor device 204(B) may be determined using Bluetooth as shown in FIG. 2. For example, when client device 202 is within close proximity for both anchor device 204(A) and anchor device 204(B), a BLE signal between the client device 202 and anchor device 204(A) and anchor device 204(B) will be utilized to assess a level of SSID biasing performed for the validations.

Once a security service 206 performs an authentication of client device 202 to connect to a secured resource, the security service 206 determines the Wi-Fi fingerprint of client device 202. Using Bluetooth pairing as illustrated in FIG. 2, the security service 206 receives the Bluetooth pairing information and determines whether the client device 202 is within a threshold proximity to anchor device 204(A) and/or anchor device 204(B). Anchor device 204(A)

and anchor device 204(B) periodically send Wi-Fi metrics to an anchor device platform 210. The Wi-Fi metrics may be used to determine and store an anchored WLAN map 212. The security service 206 may query the anchor device platform 210 for the anchored WLAN map 212, which the anchor device platform, in turn, will send to the security service 206. The security service 206 can detect a change to the Wi-Fi fingerprint of the client device 202, but if the client device 202 remains within a threshold proximity of the anchor device 204(A) and/or anchor device 204(B) (e.g., determined using Bluetooth), and as long as the Wi-Fi fingerprint of the anchor device(s) 204 to which the client device 202 is paired using Bluetooth remains the same, the security service 206 may continue to allow access to the secured resource. Alternately, if the client device 202 is no longer paired with either anchor device 204(A) or anchor device 204(B), the security service 206 may trigger a reauthentication of the client device 202 to reconnect to the secured resource.

Figure 3:
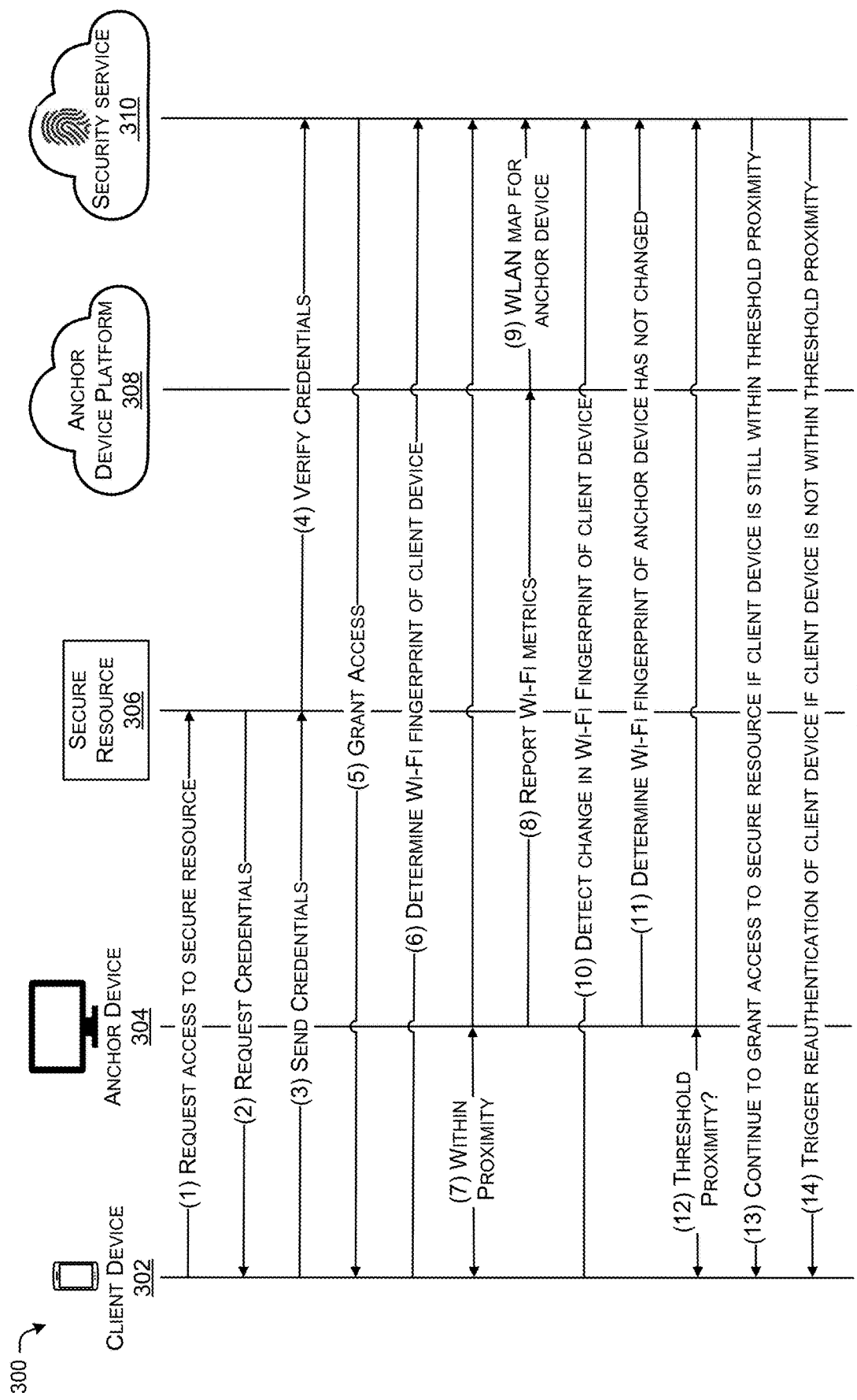
FIG. 3 illustrates example signaling for authenticating a client device and using Wi-Fi fingerprinting and proximity to an anchor device to determine whether to continue allowing access to a secure resource or trigger reauthentication.

FIG. 3 illustrates example signaling 300 for authenticating and reauthenticating a client device 302 based on a proximity to an anchor device 304. At (1) the client device 302 attempts to access the secured resource 306. At (2) the secured resource 306 prompts for user credentials, and at (3) the user ID and password (the credentials) are input at the client device 302 and sent to the secured resource 306. At (4) the user credentials are verified and at (5) the security service 310 grants access to the secure resource 306 by the client device 302.

At (6) the security service 310 can determine the Wi-Fi fingerprint of the client device 302. The Wi-Fi fingerprint is a hash value of the Wi-Fi SSID values available to client device 302, for example as illustrated in FIG. 1 in the Local SSID Map associated with client device 102. At (7) A proximity between the client device 302 and the anchor device 304 is determined. For example, if the client device 302 and the anchor device 304 are within a close proximity of each other, they may be paired using Bluetooth. Because they are paired using Bluetooth, they are within a threshold proximity of one another. The Bluetooth pairing information is sent to the security service 310, thus, the security service 310 will know that client device 302 and the anchor device 304 are within a close proximity. At (8) the anchor device 304 will periodically report Wi-Fi metrics to an anchor device platform 308. For example, as shown in FIG. 1, anchor device 104 will periodically report Wi-Fi metrics to anchor device platform 110, and from which an anchored WLAN map 112 may be determined.

At (9) the anchor device platform 308 will send WLAN map for anchor device 304 to the security service 310 when queried to do so. For example, with reference to FIG. 1 the security service 106 will query the anchor device platform 110 for the anchored WLAN map 112, and in turn, the anchor device platform 110 will send information including the WLAN map for the anchor device to the security service 310, thus the security service determines a Wi-Fi fingerprint for the anchor device 304.

At (10) the security service 310 detects a change in the Wi-Fi fingerprint of the client device 302. For instance, if a user associated with a mobile client device 302 simply moves across a room with the client device 302, the Wi-Fi fingerprint of the client device 302 may change. Based on the anchor device 304 periodically reporting their Wi-Fi metrics and the anchor device platform 308 sending a WLAN map for the anchor device 304 to the security service 310, the security service 310 can determine at (11) that the Wi-Fi fingerprint of the anchor device 304 has not changed. Although a move across a room is sufficient to change the Wi-Fi fingerprint of the client device 302, it is a false positive for location change that without enhanced anchor device Wi-Fi fingerprinting would trigger a reauthentication of the client device 302 in order to continue access to the secure resource 306. However, by determining that the client device 302 and the anchor device 304 are still within a threshold proximity at (12), the security service 310 may continue to grant access to the secure resource 306 at (13) when the client device 302 and the anchor device 304 are still paired using Bluetooth. If a significant change in the client device 302 location occurs (e.g., moves from a known user work location to a coffee shop) causing the Wi-Fi fingerprint to change and the client device 302 and the anchor device 304 to not be paired via Bluetooth anymore, at (14) the security service 310 may trigger a reauthentication of client device 302 in order for continued access to the secure resource 306.

Figure 4:
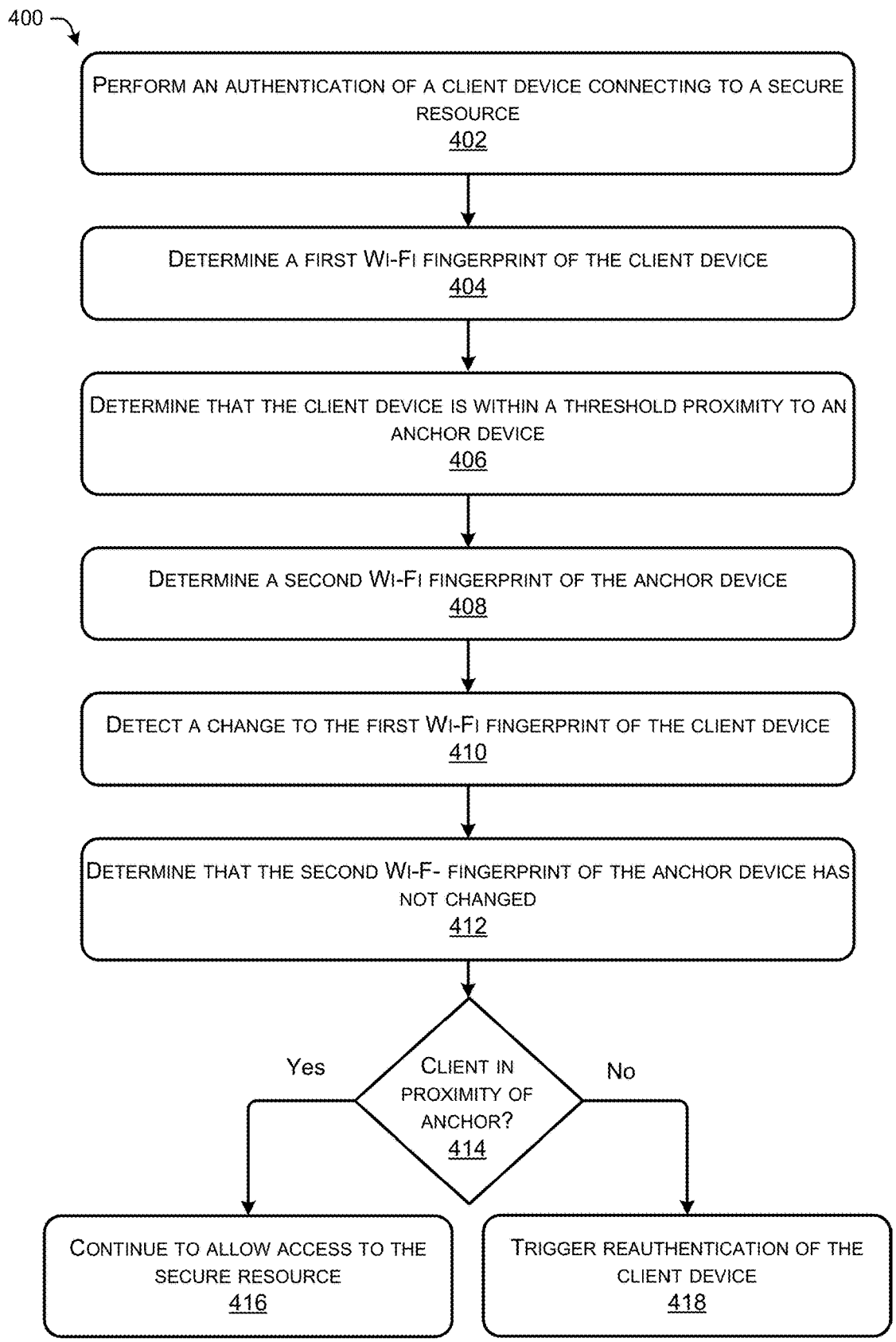
FIG. 4 illustrates an example process for determining whether to continue allowing access to a secure resource or trigger reauthentication of a client device based on proximity to an anchor device.

FIG. 4 is a flow diagram illustrating an example method 400 associated with techniques described herein for determining whether to continue allowing access to a secure resource or trigger reauthentication of a client device based on proximity of the client device to an anchor device. The logical operations described herein with respect to FIG. 4 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in FIG. 4 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At operation 402, an authentication of a client device connecting to a secure resource is performed. For example, with reference to FIG. 1, the security service may implement an MFA procedure to authenticate the client device 102 and/or a user of client device 102 to connect to a secured resource. A secured resource may be access to an electronic device, an application, a service, etc.

At operation 404, a first Wi-Fi fingerprint of the client device is determined. For example, with reference to FIG. I client device 102 is shown having a specific local SSID map, a hash of this information is sent to the security service 106 and this Wi-Fi fingerprint may be stored in the fingerprint repository 108 as a benchmark for comparison to future Wi-Fi fingerprints when client device 102 attempts to connect to the secured resource. Alternately or in addition, if the fingerprint repository 108 already has benchmark Wi-Fi fingerprint data, the current Wi-Fi fingerprint may be compared to the benchmark data.

At operation 406, a determination is made that the client device is within a threshold proximity to an anchor device. For example, referring to FIG. 1. If the client device 102 and the anchor device 104 are paired via Bluetooth as shown, a determination can be made that the two devices are within a close proximity to one another based on their Bluetooth pairing. The Bluetooth pairing information indicating that the client device 102 and the anchor device 104 are paired may be sent to the security service 106.

At operation 408, a second Wi-Fi fingerprint of the anchor device is determined. For example, referring again to FIG. 1, the anchor device 104 periodically reports Wi-Fi metrics to the anchor device platform 110, where an anchored WLAN map 112 may be determined using the local SSID map of the anchor device 104 as shown. The security service 106 will query the anchor device platform 110 for the anchored WLAN map 112.

At operation 410, a change to the first Wi-Fi fingerprint of the client device is detected. For example, if a user associated with the client device 102 moves across a room with the client device 102, this may be enough to change the local SSID map of the client device 102 and a Wi-Fi fingerprint change is detected by the security service 106 resulting is a false positive location change. Alternately, if user credentials have been stolen, and a fraudulent attempt at access to a secured resource is made, a different IP address and Wi-Fi fingerprint will be detected resulting in a physical location change being detected.

At operation 412, a determination is made that the second Wi-Fi fingerprint of the anchor device has not changed. Using the periodically reported Wi-Fi metrics from the anchor device 104 to the anchor device platform 110, the security service 106 can query for the anchored WLAN map 112 and determine that the Wi-Fi fingerprint of the anchor device has not changed.

At operation 414, a determination is made whether the client device is within the threshold proximity of the anchor device. For example, in FIG. 1, if the client device 102 and the anchor device 104 are paired via Bluetooth as shown, by the nature of Bluetooth the devices are in close proximity. However, if user credentials have been stolen and a fraudulent attempt to access the secured resource is made, a device attempting to access the secure resource, and the anchor device 104 will not be paired via Bluetooth.

In response to the client device being within the threshold proximity of the anchor device, at operation 416, continued access to the secured resource is allowed. Again, in FIG. 1 when the client device 102 and anchor device 104 are paired via Bluetooth as shown, they are, by the nature of Bluetooth, within the threshold proximity, and the client device 102 may be granted access to, or continued access to a secured resource.

In response to the client device not being within the threshold proximity of the anchor device, at operation 418, a reauthentication of the client device is triggered. For example, in FIG. 1 if the client device 102 and the anchor device 104 are no longer close enough to be paired via Bluetooth, the two devices are no longer within a threshold proximity and the security service 106 will trigger a reauthentication of the client device 102 in order for the client device to reconnect to a secure resource. Additionally, in the example above where credential have been stolen and a fraudulent attempt to access the secure resource using the credentials is attempted, the security service will determine that a device where the attempted access is being performed is not within a threshold proximity (e.g., not paired via Bluetooth) to the anchor device 104, and reauthentication will be triggered.

Figure 5:
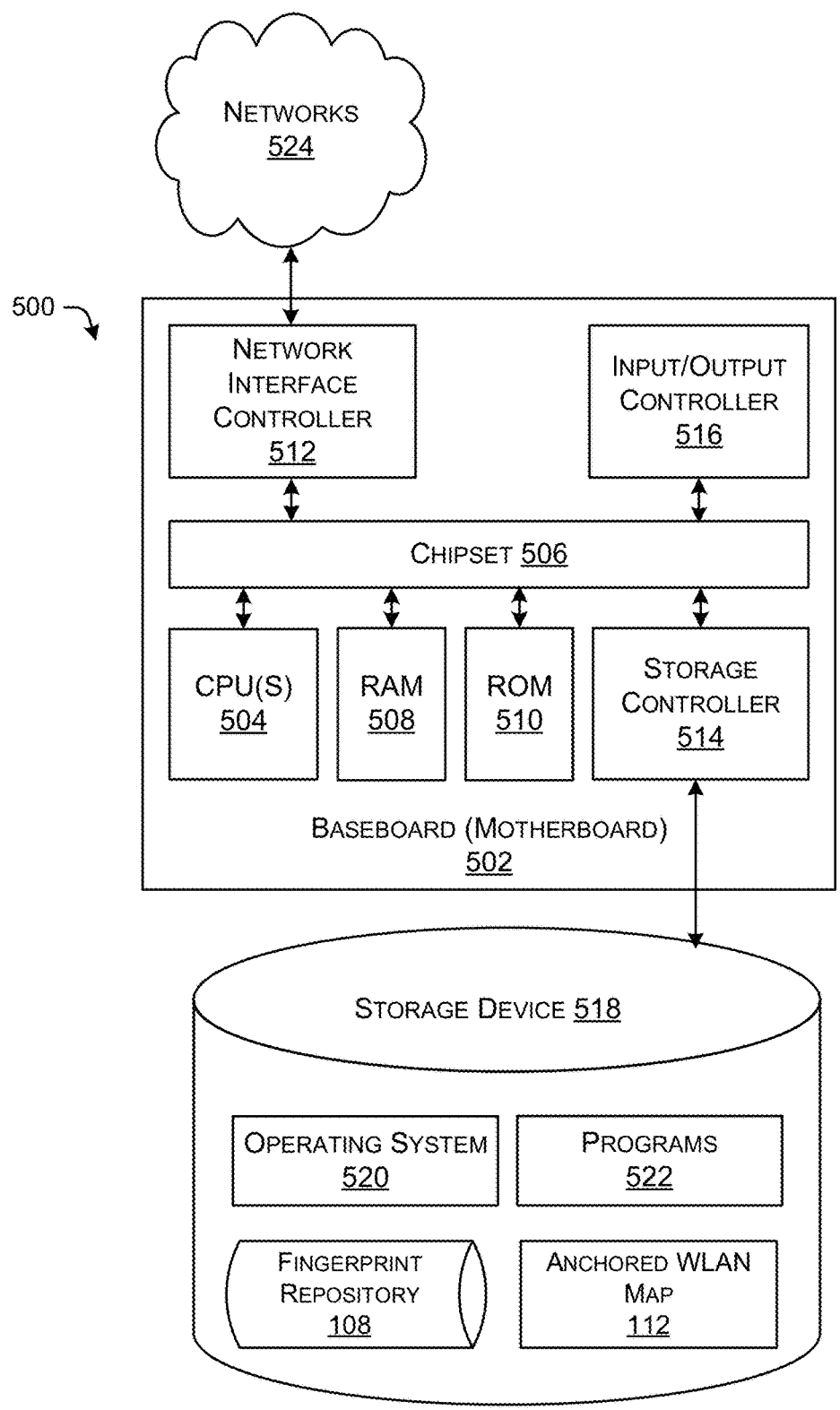
FIG. 5 shows an example computer architecture for a server computer capable of executing program components for implementing the functionality described herein.

FIG. 5 is a computer architecture diagram showing an illustrative computer hardware architecture for implementing a computing device that can be utilized to implement aspects of the various technologies presented herein. The computer architecture shown in FIG. 5 illustrates a conventional server computer, network node (e.g., secure access node), router, workstation, desktop computer, laptop, tablet, network appliance, e-reader, smartphone, load balancer, or other computing device, and can be utilized to execute any of the software components presented herein.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network. The chipset 506 can include functionality for providing network connectivity through a NIC 512, such as a gigabit Ethernet adapter. The NIC 512 is capable of connecting the computer 500 to other computing devices over the network 524. It should be appreciated that multiple NICs 512 can be present in the computer 500, connecting the computer to other types of networks and remote computer systems. In some examples, the NIC 512 may be configured to perform at least some of the techniques described herein.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the architecture in environment 100 and or any components included therein, may be supported by one or more devices similar to computer 500. Stated otherwise, some or all of the operations performed by the architecture in environment 100, and or any components included therein, may be performed by one or more computer devices 500 operating in a scalable arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes and functionality described above with regard to FIGS. 1-4, and herein. The computer 500 can also include computer readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

The computer 500 may include one or more hardware processors (processors) configured to execute one or more stored instructions. The processor(s) may comprise one or more cores. Further, the computer 500 may include one or more network interfaces configured to provide communications between the computer 500 and other devices. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure for using device proximity of a primary device and a secondary device to allow or deny connections to secured resource(s), as well as terminate existing connections to the secured resource(s).

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method performed at least in part by a security service, the method comprising:
performing an authentication of a client device connecting to a secure resource;
determining a first Wi-Fi fingerprint of the client device;
determining that the client device is within a threshold proximity to an anchor device;
determining a second Wi-Fi fingerprint of the anchor device;
detecting a change to the first Wi-Fi fingerprint of the client device;
determining that the second Wi-Fi fingerprint of the anchor device has not changed;
determining whether the client device is within the threshold proximity of the anchor device;
in response to the client device being within the threshold proximity of the anchor device, continuing to allow access to the secured resource; and
in response to the client device not being within the threshold proximity of the anchor device, triggering a reauthentication of the client device.

2. The method of claim 1, wherein determining whether the client device is within the threshold proximity of the anchor device further comprises receiving, from the client device, Bluetooth pairing information including an indication that the client device and the anchor device are paired.

3. The method of claim 1, further comprising determining whether the client device is at a trusted location based at least in part on historical Wi-Fi associations including WLAN name, BSSID, and signal range.

4. The method of claim 1, further comprising:
determining the client device is within the threshold proximity of a second anchor device;
determining a third Wi-Fi fingerprint of the second anchor device;
detecting the change to the first Wi-Fi fingerprint of the client device; determining that the third Wi-Fi fingerprint of the second anchor device has not changed;
determining whether the client device is within the threshold proximity of at least one of the first anchor device or the second anchor device;
in response to the client device being within the threshold proximity of at least one of the first anchor device of the second anchor device, continuing to allow access to the secured resource; and
in response to the to the client device not being within the threshold proximity of at least one of the first anchor device or the second the second anchor device, triggering a reauthentication of the client device.

5. The method of claim 1, wherein the anchor device is a stationary device associated with a video conferencing platform.

6. The method of claim 5, further comprising periodically receiving, from the video conferencing platform, a WLAN map generated for the anchor device.

7. The method of claim 1, further comprising storing the Wi-Fi fingerprint of the client device and the Wi-Fi fingerprint of the anchor device in a Wi-Fi fingerprint repository associated with the security service.

8. A system, comprising:
at least one processor; and
one or more non-transitory media storing instructions that, when executed by the system, cause the system to perform operations comprising:
performing an authentication of a client device connecting to a secure resource;
determining a first Wi-Fi fingerprint of the client device;
determining that the client device is within a threshold proximity to an anchor device;
determining a second Wi-Fi fingerprint of the anchor device;
detecting a change to the first Wi-Fi fingerprint of the client device;
determining that the second Wi-Fi fingerprint of the anchor device has not changed;
determining whether the client device is within the threshold proximity of the anchor device;
in response to the client device being within the threshold proximity of the anchor device, continuing to allow access to the secured resource; and
in response to the client device not being within the threshold proximity of the anchor device, triggering a reauthentication of the client device.

9. The system of claim 8, wherein determining whether the client device is within the threshold proximity of the anchor device further comprises receiving, from the client device, Bluetooth pairing information including an indication that the client device and the anchor device are paired.

10. The system of claim 8, the operations further comprising determining whether the client device is at a trusted location based at least in part on historical Wi-Fi associations including WLAN name, BSSID, and signal range.

11. The system of claim 8, the operations further comprising:
determining the client device is within the threshold proximity of a second anchor device;
determining a third Wi-Fi fingerprint of the second anchor device;
detecting the change to the first Wi-Fi fingerprint of the client device; determining that the third Wi-Fi fingerprint of the second anchor device has not changed;
determining whether the client device is within the threshold proximity of at least one of the first anchor device or the second anchor device;
in response to the client device being within the threshold proximity of at least one of the first anchor device of the second anchor device, continuing to allow access to the secured resource; and
in response to the to the client device not being within the threshold proximity of at least one of the first anchor device or the second the second anchor device, triggering a reauthentication of the client device.

12. The system of claim 8, wherein the anchor device is a stationary device associated with a video conferencing platform.

13. The system of claim 12, the operations further comprising periodically receiving, from the video conferencing platform, a WLAN map generated for the anchor device.

14. The system of claim 8, the operations further comprising, storing the Wi-Fi fingerprint of the client device and the Wi-Fi fingerprint of the anchor device in a Wi-Fi fingerprint repository associated with a security service.

15. One or more non-transitory computer-readable media storing instructions that, when executed, cause one or more processors to perform operations comprising:
performing an authentication of a client device connecting to a secure resource;
determining a first Wi-Fi fingerprint of the client device;
determining that the client device is within a threshold proximity to an anchor device;
determining a second Wi-Fi fingerprint of the anchor device;

detecting a change to the first Wi-Fi fingerprint of the client device;

determining that the second Wi-Fi fingerprint of the anchor device has not changed;

determining whether the client device is within the threshold proximity of the anchor device;

in response to the client device being within the threshold proximity of the anchor device, continuing to allow access to the secured resource; and in response to the client device not being within the threshold proximity of the anchor device, triggering a reauthentication of the client device.

16. The one or more non-transitory computer-readable media of claim 15, wherein determining whether the client device is within the threshold proximity of the anchor device further comprises receiving, from the client device, Bluetooth pairing information including an indication that the client device and the anchor device are paired.

17. The one or more non-transitory computer-readable media of claim 15, the operations further comprising determining a location of the client device based at least in part on historical Wi-Fi associations including WLAN name, BSSID, and signal range.

18. The one or more non-transitory computer-readable media of claim 15, the operations further comprising:

determining the client device is within the threshold proximity of a second anchor device;

determining a third Wi-Fi fingerprint of the second anchor device;

detecting the change to the first Wi-Fi fingerprint of the client device; determining that the third Wi-Fi fingerprint of the second anchor device has not changed;

determining whether the client device is within the threshold proximity of at least one of the first anchor device or the second anchor device;

in response to the client device being within the threshold proximity of at least one of the first anchor device of the second anchor device, continuing to allow access to the secured resource; and in response to the to the client device not being within the threshold proximity of at least one of the first anchor device or the second the second anchor device, triggering a reauthentication of the client device.

19. The one or more non-transitory computer-readable media of claim 15, wherein the anchor device is a stationary device associated with a video conferencing platform.

20. The one or more non-transitory computer-readable media of claim 15, the operations further comprising storing the Wi-Fi fingerprint of the client device and the Wi-Fi fingerprint of the anchor device in a Wi-Fi fingerprint repository associated with a security service.

* * * * *